United States Patent
Lee et al.

[19]

[11] Patent Number: 6,144,545

[45] Date of Patent: *Nov. 7, 2000

[54] MICROACTUATOR AND METHOD FOR CONTROLLING RESONANT FREQUENCY THEREOF

[75] Inventors: Ki-bang Lee, Seoul; Ci-moo Song, Sungnam; Young-ho Cho, Daejeon, all of Rep. of Korea

[73] Assignees: Samsung Electronics Co., Ltd., Suwon; Korea Advanced Institute of Science and Technology, Taejon, both of Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 09/065,721

[22] Filed: Apr. 24, 1998

[30] Foreign Application Priority Data

Sep. 25, 1997 [KR] Rep. of Korea ............ 97-48858

[51] Int. Cl.[7] .................................................. H02N 15/00
[52] U.S. Cl. ............................................ 361/233; 200/181
[58] Field of Search ................................... 361/230–235; 200/181

[56] References Cited

U.S. PATENT DOCUMENTS

| | | | |
|---|---|---|---|
| 3,686,593 | 8/1972 | Zakaria | 200/181 |
| 5,124,879 | 6/1992 | Goto | 361/233 |
| 5,168,249 | 12/1992 | Larson | 200/181 |
| 5,794,761 | 8/1998 | Renaud et al. | 200/181 |

OTHER PUBLICATIONS

Ki Bang Lee et al., "A Lateral Repulsive–force Drive Using Asymmetric Electrostatic Field," published Apr. 26, 1997, in Collection of Papers by MEMS Study Group of the Korea Institute of Electrical Engineers, consisting of 4 cover sheets, and pp. 167–176. (Partial English Language Translation Attached).

*Primary Examiner*—Fritz Fleming
*Attorney, Agent, or Firm*—Burns, Doane, Swecker & Mathis, L.L.P.

[57] ABSTRACT

A microactuator is provided. The microactuator includes a substrate, a support fixed to an upper surface of the substrate, an elastic member connected to the support, an inertial member connected to the elastic member and spaced apart from the upper surface of the substrate by a predetermined distance, to be vibrated in a first direction parallel to the substrate, moving electrodes protruding from both sides of the inertial member in a second direction perpendicular to the first direction, fixed electrodes fixed on the substrate, facing the moving electrodes, spaced apart from the moving electrodes by a predetermined distance, and supplying an electrostatic repulsive force in the first direction to the moving electrodes when an electric potential is applied, common electrodes fixed on the substrate in the first direction, spaced apart from the moving electrodes and the fixed electrodes by a predetermined distance, and a power supply applying an electric potential to the moving electrodes, the fixed electrodes and the common electrodes.

9 Claims, 6 Drawing Sheets

MICROACTUATOR AND METHOD FOR CONTROLLING RESONANT FREQUENCY THEREOF

BACKGROUND OF THE INVENTION

1. Field of the Invention

The present invention relates to a microactuator for finely vibrating a structure by an electrostatic repulsive force, and a method for controlling the resonant frequency thereof.

2. Description of the Related Art

A microactuator using an electrostatic force may be classified into one using an electrostatic attractive force and the other using an electrostatic repulsive force.

A microactuator using the electrostatic attractive force is disclosed in U.S. Pat. No. 5,025,346, and shown in FIG. 1. On an inertial member 10, moving electrodes 11 are formed to be interposed between and adjacent to fixed electrodes 12. The microactuator is driven by an electrostatic attractive force between the moving electrodes 11 and the fixed electrodes 12. However, the resonant frequency of the inertial member 10 cannot be changed.

Another microactuator using the electrostatic attractive force is disclosed in "A Micromachined, single-crystal silicon, tunable resonator," J. J. Yao and N. C. MacDonald in J. Micromech. Microeng., Vol. 6, 1996, pp. 257–264. In this microactuator, if a voltage applied between the flat-shaped inertial member and a bottom electrode is increased in order to generate the electrostatic attractive force therebetween, the resonant frequency of the inertial member tends to be reduced. If the electrostatic attractive force is increased, the inertial member adheres to the bottom electrode.

A method for driving an inertial member using the electrostatic repulsive force is disclosed in "Electrostatic Comb Drive Levitation and Control Method", J. Microelectromech. Sys., Vol. 1, No. 4 (1992) pp170–178. According to the method, as shown in FIG. 2, an inertial member 23 supported from a base 21 by a spring 22 is vertically driven by an electrostatic repulsive force formed between a substrate 20 and the inertial member 23.

SUMMARY OF THE INVENTION

It is an objective of the present invention to provide a microactuator having an inertial member capable of moving parallel to a substrate according to a horizontal electrostatic repulsive force.

Accordingly, to achieve the above objective, there is provided a microactuator comprising: a substrate; a support fixed to an upper surface of the substrate; an elastic member connected to the support; an inertial member connected to the elastic member and spaced apart from the upper surface of the substrate by a predetermined distance, to be vibrated in a first direction parallel to the substrate; moving electrodes protruding from both sides of the inertial member in a second direction perpendicular to the first direction; fixed electrodes fixed on the substrate, facing the moving electrodes, spaced apart from the moving electrodes by a predetermined distance, and supplying an electrostatic repulsive force in the first direction to the moving electrodes when an electric potential is applied; common electrodes fixed on the substrate in the first direction, spaced apart from the moving electrodes and the fixed electrodes by a predetermined distance; and a power supply applying an electric potential to the moving electrodes, the fixed electrodes and the common electrodes.

According to another aspect of the present invention, there is provided a microactuator comprising: a substrate; a support fixed to an upper surface of the substrate; an elastic member connected to the support portion in a radial direction; an annular inertial member supported by the elastic member, rotating and vibrating around the support; a moving electrode protruding radially outward from the inertial member; a fixed electrode fixed to the substrate, facing the moving electrode, spaced apart from the moving electrode by a predetermined distance, and supplying an electrostatic repulsive force to the moving electrode when an electric potential is applied; a common electrode fixed to the substrate, spaced apart from the moving electrode and the fixed electrode by a predetermined distance; and a power supply applying an electric potential to the moving electrode, the fixed electrode and the common electrode.

According to still another aspect of the present invention, there is provided a method for controlling the resonant frequency of a microactuator including a substrate; a support fixed to an upper surface of the substrate; an elastic member connected to the support portion; an inertial member connected to the elastic member to be vibrated parallel to the substrate; a moving electrode protruding from the inertial member; a fixed electrode fixed to the substrate, facing the moving electrode, spaced apart from the moving electrode by a predetermined distance, and supplying an electrostatic repulsive force to the moving electrode when an electric potential is applied; a common electrode fixed to the substrate, spaced apart from the moving electrode and the fixed electrode by a predetermined distance; and a power supply applying an electric potential to the moving electrode, the fixed electrode and the common electrode, comprising the steps of: applying the same electric potential to the fixed electrode and the moving electrode, to form an electrostatic repulsive force therebetween; and controlling an electric potential applied to the common electrode to change the resonant frequency of the inertial member.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
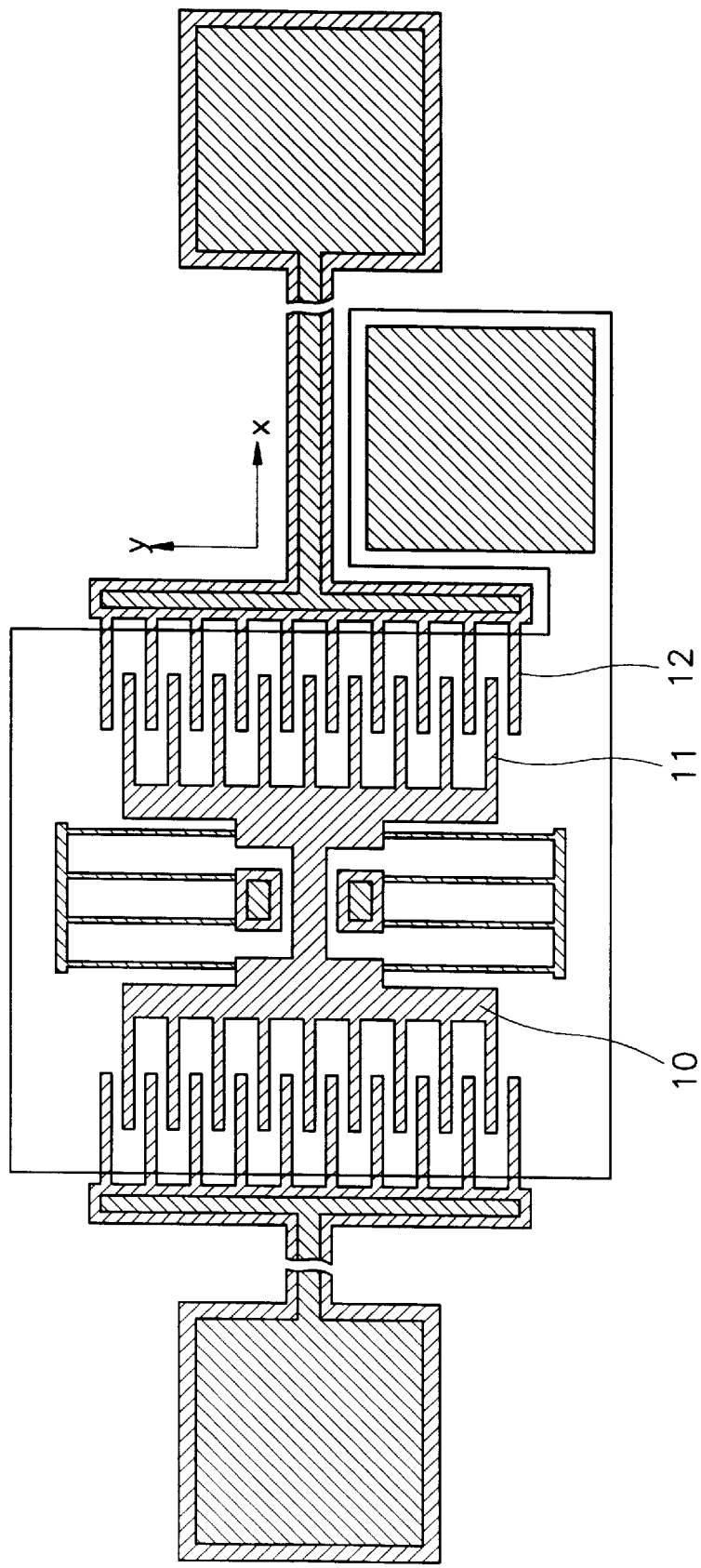
FIG. 1 is a plan view of a conventional microactuator.
Figure 2:
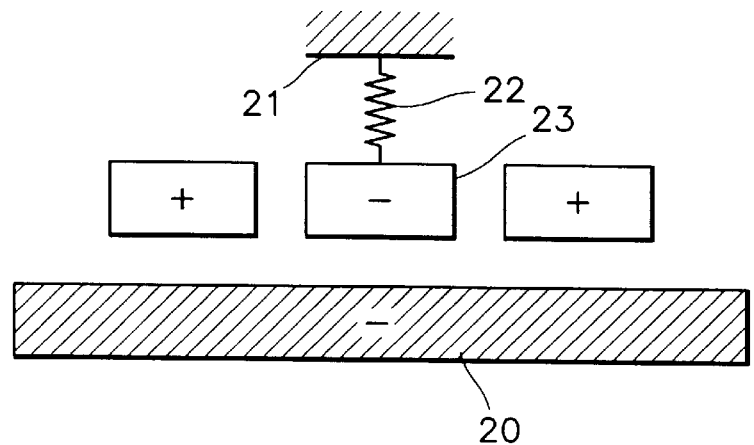
FIG. 2 is a side view of a conventional vertically driven-type actuator.
Figure 3:
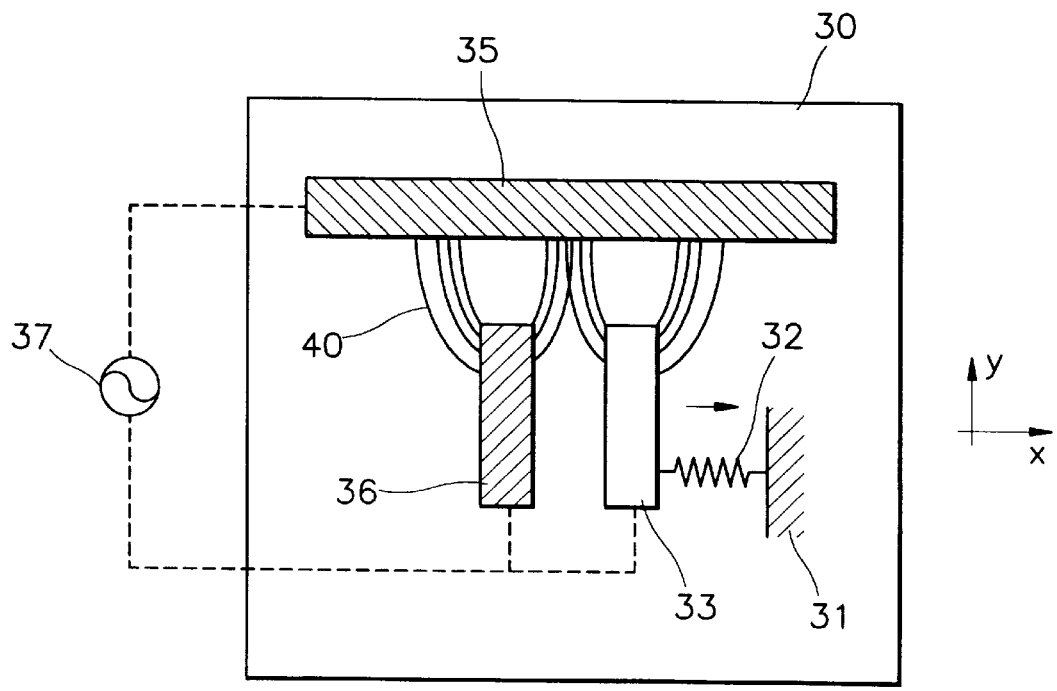
FIG. 3 is a plan view of a microactuator according to an embodiment of the present invention.

Referring to FIG. 3, showing a microactuator according to an embodiment of the present invention, a lengthwise common electrode 35 is installed in an X-direction on a substrate 30, and a fixed electrode 36 is installed in a Y-direction, perpendicular to the common electrode 35. Also, a moving electrode 33 of an inertial member faces the fixed electrode 36, spaced a predetermined distance apart from the fixed electrode 36. The moving electrode 33 is supported from a support portion 31 by a spring 32, to move with respect to the substrate 30.

A power supply 37 for horizontally driving the moving electrode 33 is connected to the common electrode 35, the fixed electrode 36 and the moving electrode 33. When the power supply 37 applies a voltage, asymmetric electrofield lines 40 are formed between the fixed electrode 36, the moving electrode 33 and the common electrode 35. Thus, the moving electrode 33 moves in the X-direction of FIG. 3 due to the electrostatic repulsive force between the fixed electrode 36 and the moving electrode 33.

Figure 4:
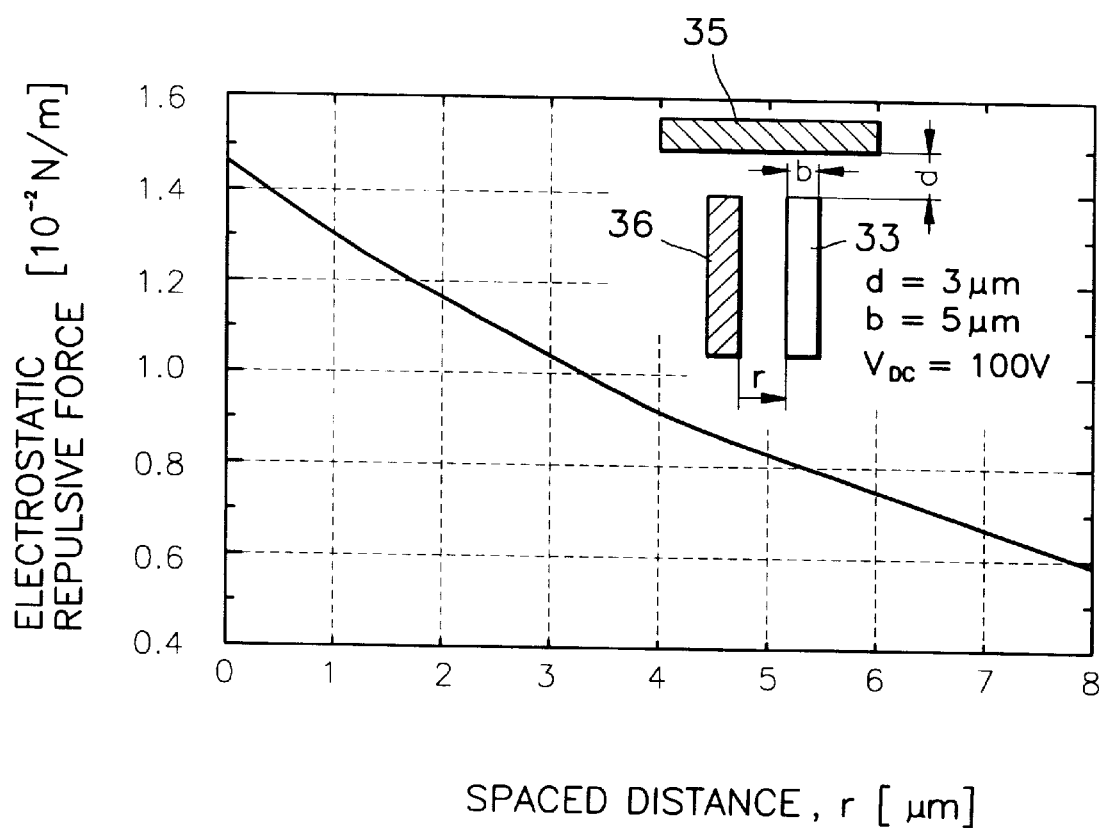
FIG. 4 is a graph showing electrostatic repulsive force according to the distance between electrodes of the actuator of FIG. 3.

The electrostatic repulsive force between the fixed electrode 36 and the moving electrode 33 decreases according to increase in the interval therebetween. FIG. 4 shows the electrostatic repulsive force according to the distance r between the fixed electrode 36 and the moving electrode 33, calculated by a finite element method, when the power supply voltage is 100V, a width b of the moving electrode 33 is 5 $\mu$m, and an interval d between the moving electrode 33 and the common electrode 35 is 3 $\mu$m.

Meanwhile, the effective elastic coefficient $K_{eff}$ of the moving electrode 33 is determined by the elastic coefficient of the spring 32 and the voltage of the power supply 37. Thus, the resonant frequency of the moving electrode 33 can be varied according to the voltage of the power supply 37.

The correlation between the resonant frequency of the actuator and the voltage of the power supply 37 is obtained as follows.

The effective elastic coefficient $K_{eff}$ of the moving electrode 33 can be obtained by the equilibrium between the electrostatic repulsive force and the restoring force of the spring 32 as follows.

$$K_{eff} = \frac{\partial}{\partial r}\left\{(k(r-r_0) - Ae^{\frac{-r}{B}}V_{DC}^2\right\}_{r=r_1} = k + \frac{A}{B}e^{\frac{-r_1}{B}}V_{DC}^2 \quad \text{(Formula 1)}$$

Here, k indicates a constant of a spring 32, r indicates the distance between the fixed electrode 36 and the moving electrode 33, $r_0$ indicates the initial distance between the fixed electrode 36 and the moving electrode 33 before applying a voltage, $V_{DC}$ indicates a direct current voltage applied by the power supply 37 between the common electrode 35 and both the moving electrode 33 and the fixed electrode 36, and $r_1$ indicates an equilibrium distance between the fixed electrode 36 and the moving electrode 33 maintained by equilibrium of forces in the state in which a voltage is applied. Also, A and B indicate coefficients of an exponential function $Ae^{-r/B}V^2_{DC}$ which is derived from an electrostatic repulsive force curve of FIG. 4.

Also, the correlation between the voltage $V_{DC}$ and the equilibrium distance $r_1$ can be obtained from the equilibrium equation ($Ae^{-r_1/B}V^2_{DC}=k(r_1 - r_0)$) between the restoring force of the spring 32 and the electrostatic repulsive force as Formula 2.

$$V_{DC} = \sqrt{\frac{k}{A}(r_1 - r_0)e^{\frac{r_1}{B}}} \quad \text{(Formula 2)}$$

The effective elastic coefficient $K_{eff}$ is obtained from the Formulas 1 and 2 as follows.

$$K_{eff} = k\left(1 + \frac{r_1 - r_0}{B}\right) \quad \text{(Formula 3)}$$

The resonant frequency fr of the actuator is obtained from Formula 3 as follows.

$$f_r = \frac{1}{2\pi}\sqrt{\frac{k_{eff}}{m}} = \frac{1}{2\pi}\sqrt{\frac{k}{m}}\sqrt{1 + \frac{r_1 - r_0}{B}} \quad \text{(Formula 4)}$$

In Formula 4, the equilibrium distance $r_1$ is a function of the voltage $V_{DC}$ (see Formula 2), so that the resonant frequency can be controlled by varying the voltage $V_{DC}$.

Figure 5:
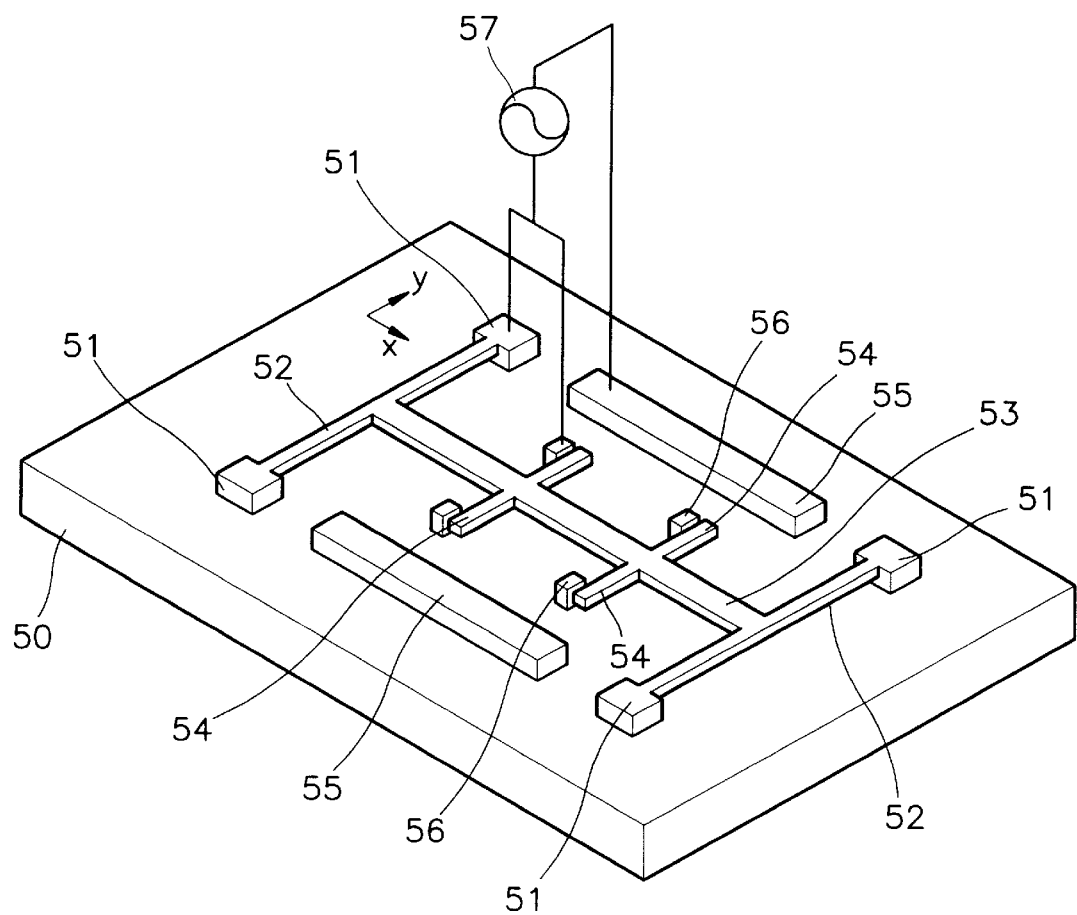
FIG. 5 is a perspective view of a microactuator according to another embodiment of the present invention.

Referring to FIG. 5, showing a microactuator according to another embodiment of the present invention, moving electrodes 54 extend in the Y-direction from both sides of the rectangular inertial member 53 installed in the X-direction with being spaced a predetermined distance apart from each other.

Both ends of the inertial member 53 are connected to an elastic members 52 which are supported at a predetermined spacing from the substrate 50 by supports 51 fixed to the substrate 50 and enable the inertial member 53 to be vibrated in the X-direction. Thus, the inertial member 53 is spaced apart from the upper surface of the substrate 50.

Fixed electrodes 56 are fixed to the substrate 50, spaced apart from the corresponding moving electrodes 54 by a predetermined interval. Also, lengthwise common electrodes 55 are installed in the X-direction on the substrate 50 on both sides of the inertial member 53, spaced apart from the moving electrodes 54 and the fixed electrodes 56 by a predetermined interval.

Preferably, the supports 51, the elastic members 52, the inertial member 53 and the moving electrodes 54 are integrally formed of an elastic and conductive material by a micromachining process using photolithography. At this time, a power supply 57 applying a voltage for driving the actuator can be connected directly to the supports 51 instead of the moving electrodes 54. Alternatively, the above members can each be separately formed of materials appropriate for their function and then connected to each other.

In the operation of the microactuator, if the power supply 57 applies a voltage having an AC component and a DC component corresponding to a selected resonant frequency, then the inertial member 53 vibrates in the X-direction according to the above principle.

Figure 6:
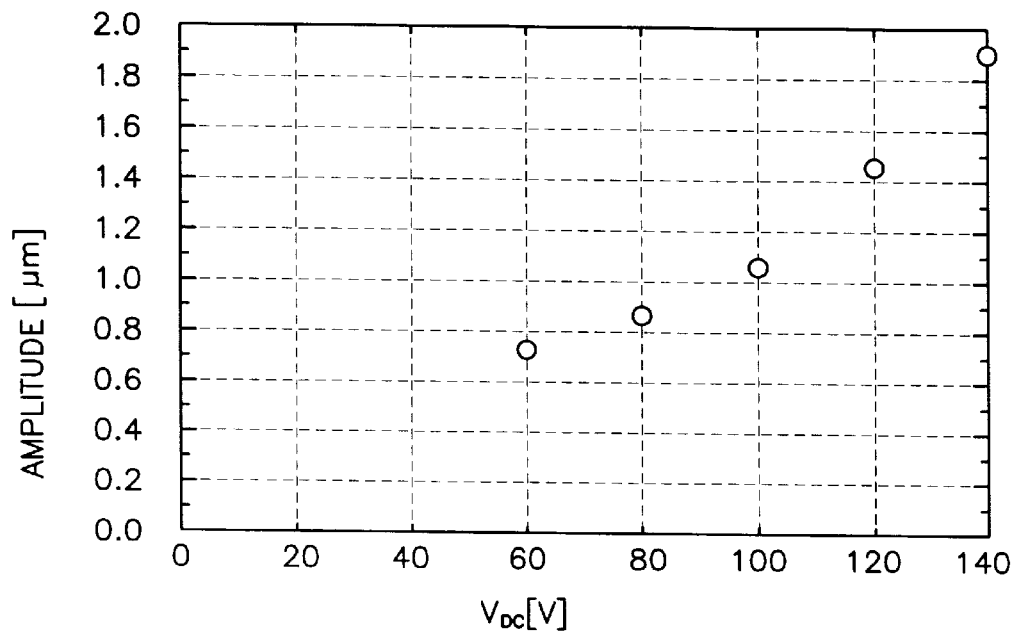
FIG. 6 is a graph of the amplitude of a vibration according to a voltage applied to electrodes in the actuator of FIG. 5.
Figure 7:
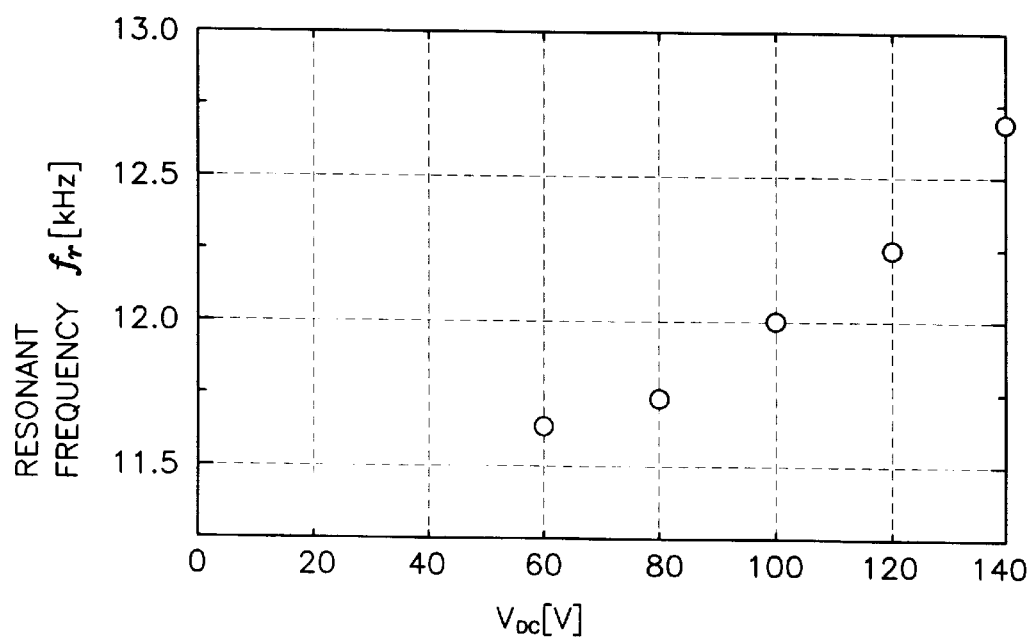
FIG. 7 is a graph showing resonant frequency according to a voltage applied to electrodes in the actuator of FIG. 5.

FIGS. 6 and 7 show the amplitude of vibration measured depending on a DC voltage applied to the electrodes and the resonant frequency thereof, respectively. Here, the power supply 57 applies a voltage in which an AC voltage of 20sin(2 $\pi$frt) is added to the DC voltage $V_{DC}$ where fr is the resonant frequency of the actuator and t is time.

As shown in the above graph, the amplitude and resonant frequency of the inertial member 53 increase according to the increase of the DC voltage $V_{DC}$ of the applied voltage $V(V=V_{DC}+V_{AC})$. Thus, the applied DC voltage is controlled in the present invention, to thereby control the vibration amplitude and the resonant frequency of the inertial member 53.

Figure 8:
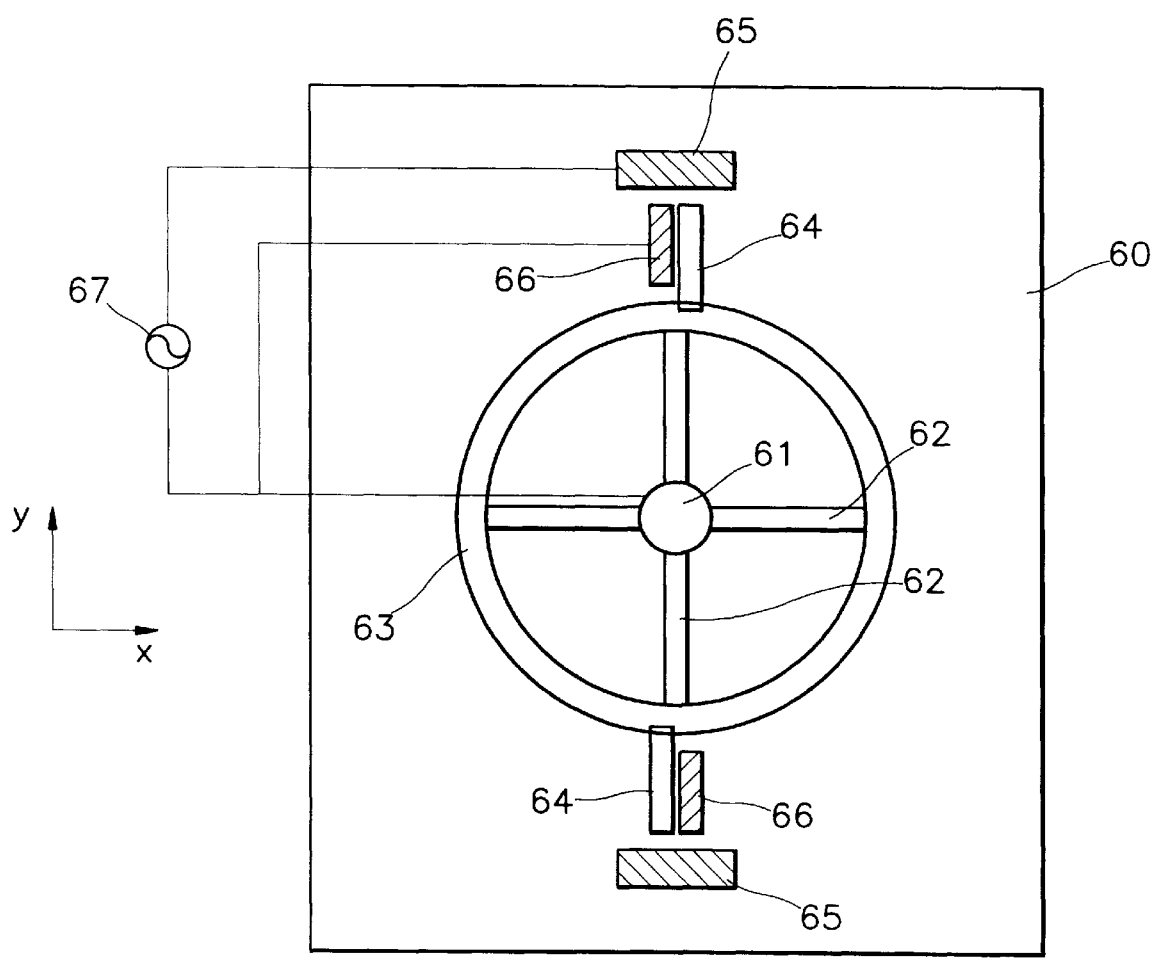
FIG. 8 is a plan view of a microactuator according to still another embodiment of the present invention.

Referring to FIG. 8 showing still another embodiment, an annular inertial member 63 of a predetermined thickness is supported by elastic members 62 on a support member 61 fixed to a substrate 60. The support 61 is positioned in the center of the annular inertial member 63, and the elastic members 62 radially connect the inertial member 63 to the support 61.

Also, moving electrodes 64 radially and outwardly protrude from the inertial member 63 in the Y-direction. Fixed electrodes 66 are fixed to the substrate 60, spaced apart from corresponding moving electrodes 64 by a predetermined interval. Lengthwise common electrodes 65 at both sides of the inertial member 63 are spaced apart from the moving electrodes 64 and the fixed electrodes 66 by a predetermined interval in the X-direction.

A power supply 67 is connected between the common electrode 65 and the moving electrode 64 and the fixed electrode 66. In this embodiment, the support 61, the elastic member 62, the inertial member 63 and the moving electrode 64 are formed in one body, of a conductive material, so that the power supply 67 can be directly connected to the support portion 61.

If the power supply 67 applies an AC voltage with DC bias voltage, an electrostatic repulsive force operates between the moving electrode 64 and the fixed electrode 66. Thus, the inertial member 63 rotates and vibrates around the support portion 61.

According to the present invention, the inertial member can be vibrated parallel to the substrate, and the resonant frequency of the inertial member can be controlled. Also, the electrostatic repulsive force between the fixed electrode and the moving electrode prevents these electrodes from adhering to each other.

What is claimed is:

1. A microactuator comprising:
   a substrate;
   a support fixed to an upper surface of the substrate;
   an elastic member connected to the support;
   an inertial member connected to the elastic member and spaced apart from the upper surface of the substrate by a predetermined distance, to be vibrated in a first direction parallel to the substrate;
   moving electrodes protruding from both sides of the inertial member in a second direction perpendicular to the first direction;
   fixed electrodes fixed on the substrate, facing the moving electrodes, spaced apart from the moving electrodes by a predetermined distance, and supplying an electrostatic repulsive force in the first direction to the moving electrodes when an electric potential is applied;
   common electrodes fixed on the substrate in the first direction, spaced apart from the moving electrodes and the fixed electrodes by a predetermined distance; and
   a power supply applying an electric potential to the moving electrodes, the fixed electrodes and the common electrodes.

2. The microactuator of claim 1, wherein the power supply is connected to the moving electrode and the fixed electrode to apply the same electric potential to both.

3. The microactuator of claim 1, wherein the support, the elastic member, the inertial member and the moving electrodes are formed in one body.

4. The microactuator of claim 3, wherein the support, the elastic member, the inertial member and the moving electrodes are formed of an elastic and conductive material.

5. A microactuator comprising:
   a substrate;
   a support fixed to an upper surface of the substrate;
   an elastic member connected to the support portion in a radial direction;
   an annular inertial member supported by the elastic member, rotating and vibrating around the support;
   a moving electrode protruding radially outward from the inertial member;
   a fixed electrode fixed to the substrate, facing the moving electrode, spaced apart from the moving electrode by a predetermined distance, and supplying an electrostatic repulsive force to the moving electrode when an electric potential is applied;
   a common electrode fixed to the substrate, spaced apart from the moving electrode and the fixed electrode by a predetermined distance; and
   a power supply applying an electric potential to the moving electrode, the fixed electrode and the common electrode.

6. The microactuator of claim 5, wherein the power supply is connected to the moving electrode and the fixed electrode to apply the same electric potential to both.

7. The microactuator of claim 5, wherein the support, the elastic member, the inertial member and the moving electrode are formed in one body.

8. The microactuator of claim 7, wherein the support, the elastic member, the inertial member and the moving electrode are formed of an elastic and conductive material.

9. A method for controlling the resonant frequency of a microactuator including a substrate; a support fixed to an upper surface of the substrate; an elastic member connected to the support portion; an inertial member connected to the elastic member to be vibrated parallel to the substrate; a moving electrode protruding from the inertial member; a fixed electrode fixed to the substrate, facing the moving electrode, spaced apart from the moving electrode by a predetermined distance, and supplying an electrostatic repulsive force to the moving electrode when an electric potential is applied; a common electrode fixed to the substrate, spaced apart from the moving electrode and the fixed electrode by a predetermined distance; and a power supply applying an electric potential to the moving electrode, the fixed electrode and the common electrode, comprising the steps of:
   applying the same electric potential to the fixed electrode and the moving electrode, to form an electrostatic repulsive force therebetween; and
   controlling the direct current voltage applied between the common electrode and both the fixed electrode and the moving electrode to change the resonant frequency of the inertial member.

* * * * *